(12) United States Patent
Eliasson et al.

(10) Patent No.: US 10,921,083 B2
(45) Date of Patent: Feb. 16, 2021

(54) ATTACHMENT ARRANGEMENT FOR A GUN MODULE ON A CARRIER

(71) Applicant: BAE SYSTEMS BOFORS AB, Karlskoga (SE)

(72) Inventors: Marcus Eliasson, Kristinehamn (SE); Peter Gardsiö, Kristinehamn (SE); Bertil Wall, Karlstad (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 0 days.

(21) Appl. No.: 16/627,306

(22) PCT Filed: Jun. 27, 2018

(86) PCT No.: PCT/SE2018/050698
§ 371 (c)(1),
(2) Date: Dec. 29, 2019

(87) PCT Pub. No.: WO2019/004916
PCT Pub. Date: Jan. 3, 2019

(65) Prior Publication Data
US 2020/0166305 A1 May 28, 2020

(30) Foreign Application Priority Data
Jun. 30, 2017 (SE) .................... 1700135-5

(51) Int. Cl.
*F41A 23/34* (2006.01)
*F41F 1/00* (2006.01)

(52) U.S. Cl.
CPC ................. *F41A 23/34* (2013.01); *F41F 1/00* (2013.01)

(58) Field of Classification Search
CPC .......... F41A 23/34; F41A 23/36; F41A 23/26; F41A 23/52; F41A 23/54; F41A 23/56
See application file for complete search history.

(56) References Cited

U.S. PATENT DOCUMENTS

| | | | | |
|---|---|---|---|---|
| 2,549,835 A | * | 4/1951 | McCann | F41A 23/50 89/40.11 |
| 4,644,844 A | * | 2/1987 | Zierler | F41A 23/36 280/426 |
| 5,419,234 A | | 5/1995 | Sanderson | |
| 5,465,808 A | | 11/1995 | Musgrove | |
| 5,604,327 A | * | 2/1997 | Skoglund | F41A 9/24 89/37.13 |

(Continued)

OTHER PUBLICATIONS

International Search Report (dated Sep. 21, 2018) for corresponding International App. PCT/SE2018/050698.

*Primary Examiner* — Joshua T Semick
(74) *Attorney, Agent, or Firm* — WRB-IP LLP (57) ABSTRACT

An attachment arrangement for a gun module of a carrier, such as a vehicle, a craft, or a structure fixedly mounted on a foundation, including, fixedly mounted on the carrier, a carrier frame. The carrier frame has at least two elongated frame portions, and the attachment arrangement includes an intermediate beam, on which the gun module is arranged. A subframe is arranged on the carrier frame, and a pair of interacting mounting plates are arranged on the subframe and the intermediate beam respectively. A weapons system includes an attachment arrangement and a superstructure module having storage spaces on top of the subframe.

9 Claims, 10 Drawing Sheets

(56) References Cited

U.S. PATENT DOCUMENTS

| | | |
|---|---|---|
| 6,564,690 B1 | 5/2003 | Long |
| 7,140,290 B2 * | 11/2006 | Borgwarth .............. F41A 23/26 89/37.05 |
| 7,357,063 B2 * | 4/2008 | Balbo .................... F41A 23/32 89/40.04 |
| 7,418,897 B2 * | 9/2008 | Balbo .................... F41A 23/56 89/40.02 |
| 7,481,147 B1 | 1/2009 | Serkland et al. |
| 9,360,266 B2 * | 6/2016 | Raczek .................. F41A 23/24 |
| 10,240,884 B1 * | 3/2019 | De Leon ................ F41A 23/26 |
| 2002/0129696 A1 | 9/2002 | Pek et al. |
| 2012/0036987 A1 | 2/2012 | Guruprasad |
| 2016/0121929 A1 | 5/2016 | Levin et al. |

* cited by examiner

ATTACHMENT ARRANGEMENT FOR A GUN MODULE ON A CARRIER

BACKGROUND AND SUMMARY

The present invention relates to an attachment arrangement for a gun module of a carrier, such as a vehicle, a craft, or a structure fixedly mounted on a foundation, the carrier comprising, fixedly mounted on the carrier, a carrier frame with at least two elongated frame portions, and the attachment arrangement further comprising an intermediate beam, on which the gun module is arranged.

Furthermore, the invention comprises a weapons system comprising an attachment arrangement.

It has been known for some time to arrange cannons, howitzers and other guns on movable carriers. These are often fairly simple structures, such as wheeled gun carriers. However, in recent years carriers that are more complex are being used, carriers that are not just self-propelled, but also provide protection for one or more operators and drivers. Advantageously, such a carrier is a heavy goods vehicle with cross-country capability and which can quickly move the gun to a different position. It can also cover longer distances during a day without the need for any other goods vehicle.

The guns arranged on the goods vehicle are more or less integrated with these and it is difficult to dismount the gun from the vehicle. In addition, it is often time-consuming. Therefore, it is difficult to use the same weapon on different carriers, even when it is desirable to upgrade or modernize the carrier as required, or to use the gun on a completely different type of carrier, for example a vessel instead of a land-based vehicle.

In order to achieve high mobility and flexibility for an artillery system and interacting transport system, it is tactically advantageous if an artillery gun, for example via an intermediate arm, can be placed relatively quickly and safely on any loadbearing platform load carrier, on a caterpillar-based, wheel-based or a marine platform.

Patent document US2004/0216597A discloses a modular artillery system, module I-IV, a first module I in the form of a gun, a second module II in the form of a charging mechanism, a third module III in the form of one or more magazines and a fourth module IV in the form of a load carrier, the modules I-III, individually or in combination, being movable between different load carriers. Secure locking of module I-III to a load carrier, module IV, is expediently carried out via a screw joint or bolted joint of known type.

Patent document WO2011/056153A also discloses an intermediate frame and an attachment system for attaching an intermediate frame to a load carrier chassis. Attaching the intermediate frame to the chassis is carried out via one or two elastic rotatable attachments and two elastic flat attachments. The rotatable attachments are arranged with their pivot axes coincident to the center axis of the intermediate frame. It is stated that the attachments solve the problem of the inherent torsional weakness, and of an intermediate frame diagonal deformations that can arise during transport.

U.S. Pat. No. 3,507,226 A describes a bayonet-type locking system for attaching/locking a load to a load carrier chassis. A series of pivotable pins are arranged in spaces underneath a loading surface and can be pivoted to active positions where they cooperate with recesses of the load to be securely locked. The locking system enables fast and flexible shifting between a locked and an unlocked position of the load on the chassis.

Since it is often desirable that a weapons system is made at least in pan in the country of use, there is also a demand for a system where the gun and the carrier are relatively easily exchangeable. At the same time, it is important that the strength of all integral components and interconnections is sufficiently high, nor only so that forces resulting during transport of the heavy gun can be taken up by the carrier, but also so that the carrier and interconnections are not damaged by the recoil forces when the gun is fired.

One problem is the high recoil forces that act on a locking system during firing of artillery guns. One requirement is that the looking system should withstand recoil forces to a magnitude of 250-300 kN, and sometimes up to approximately 600 kN, without any play arising between an artillery gun and a load carrier. The problem with the abovementioned existing quick-lock systems is that they are not dimensioned for higher recoil forces, such as 600 kN. This means that secure locking between frame and chassis, or between the gun and the intermediate frame, is not without play.

It is desirable to provide a quick and flexible attachment for attaching/locking an artillery gun to a load carrier chassis without being limited to only one type of load carrier. The attachment must withstand recoil forces of at least 250 kN, and sometimes up to 600 kN, without any play arising between the artillery gun and the load carrier.

It is also desirable to provide an attachment that allows a relatively quick change between different artillery guns on a load carrier.

According to an aspect of the invention, an attachment arrangement includes a subframe arranged on the carrier frame, and a pair of interacting mounting plates are arranged on the subframe and the intermediate beam respectively.

According to another aspect of the invention, a weapons system includes a superstructure module with storage spaces on top of the subframe.

BRIEF DESCRIPTION OF THE DRAWINGS

The invention will now be described with reference to the attached drawings, in which.

DETAILED DESCRIPTION

Figure 1:
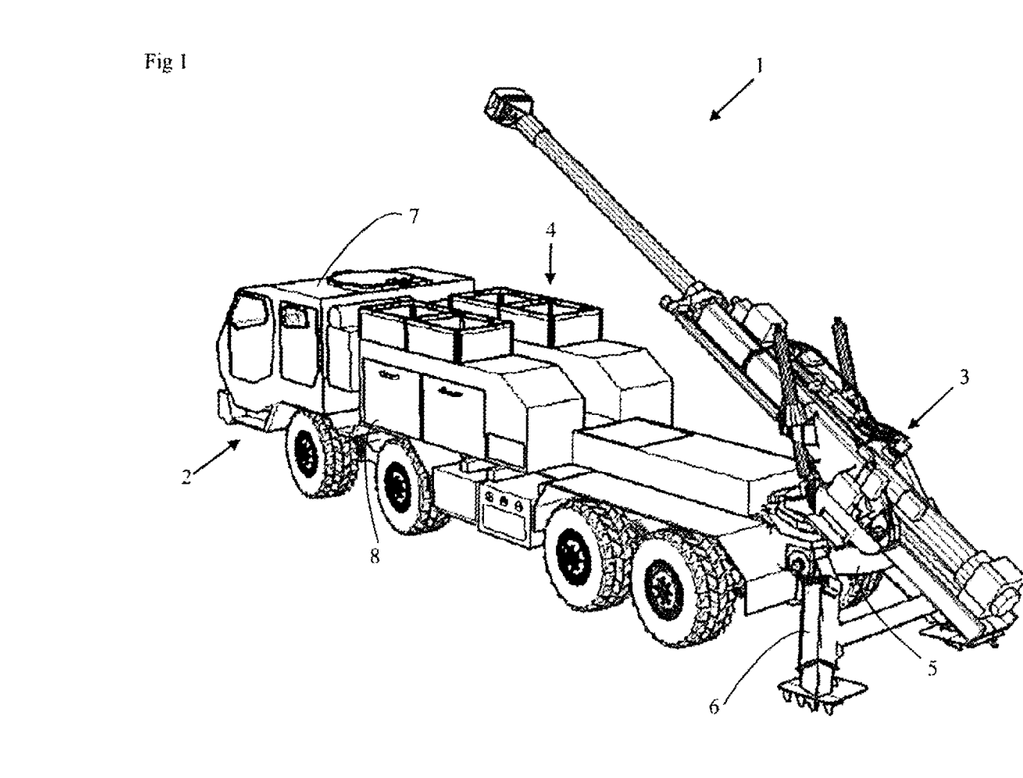
FIG. 1 shows a perspective view of a weapons system according to the invention.

FIG. 1 shows a weapons system 1, in a perspective view obliquely from behind, comprising a load carrier 2. The load carrier 2 can be some type of vehicle, craft or fixed structure, but in the preferred embodiment is a type of goods vehicle, such as a truck or equivalent.

A gun module 3, such as a howitzer or similar, is arranged on the load carrier 2. The preferred embodiment also includes a superstructure module 4 arranged on the load carrier 2. The superstructure module 4 is advantageously used for storing equipment and ammunition, and for containing electric and hydraulic systems etc in the storage spaces 8.

The gun module 3 is arranged pivotably on an intermediate beam 5, which in turn is connected to the rest of the weapons system 1 described in more detail below. Before firing the gun module 3, the gun module 3 is supported by folding support legs 6 carrying a position of the static mass of the gun module 3 when this is angled up into a firing position. The support legs 6 also take up some of the recoil forces that result from the firing.

The front portion of the load carrier 2 in the preferred embodiment includes a cab 7 for one or more persons driving the load carrier 2, and operating and firing the gun module 3. The cab 7 is advantageously equipped with protective devices of different types, for example splinter shield, bulletproof glass, radioactive shield etc., so that the safety of the personnel is maximized.

Figure 2:
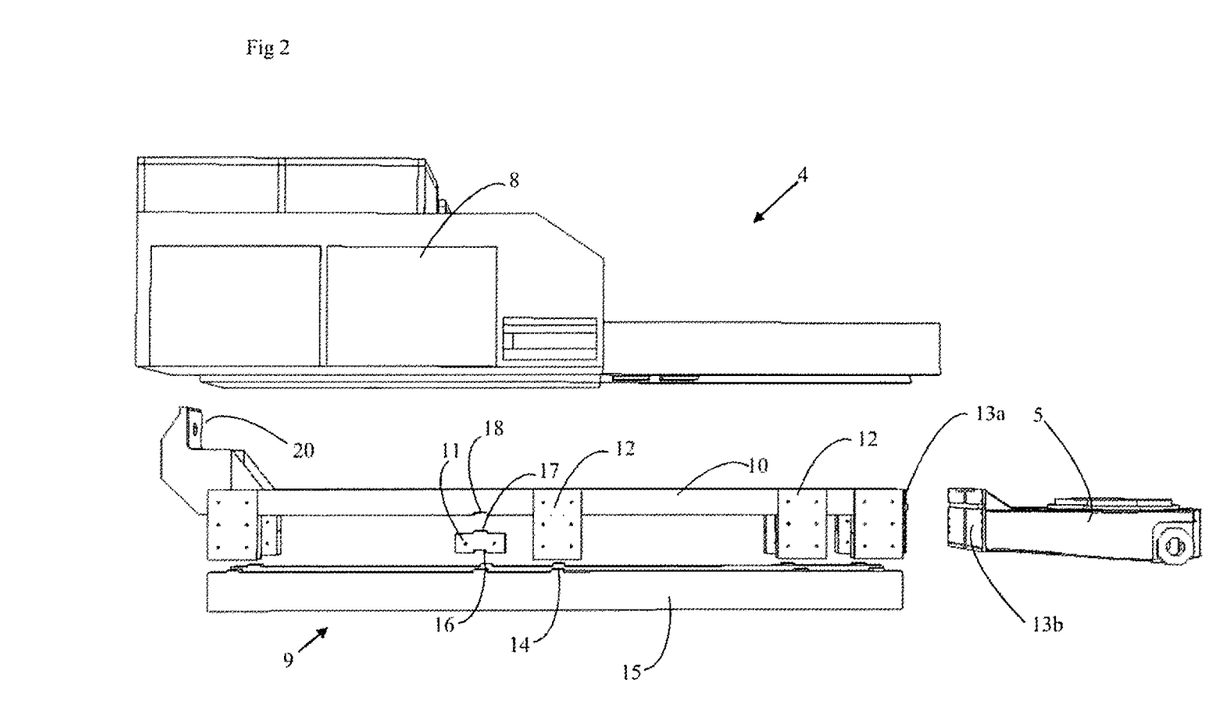
FIG. 2 shows an exploded view of a portion of the weapons system according to FIG. 1.

FIG. 2 shows the components arranged on the load carrier 2, namely a subframe 10, the intermediate beam 5 and the superstructure module 4, which are all carried directly or indirectly by a carrier frame 9 on the load carrier 2.

The carrier frame 9 is a part of the load carrier 2 and comprises at least two elongated beams 15 arranged in the longitudinal direction of the load carrier 2. In the preferred embodiment, the wheels of the load carrier 2 are suspended so that torsion forces, resulting from driving cross-country, are not transferred to the carrier frame 9 to any great extent. This is an advantage, since the gun module 3 has a rigid bottom not arranged to take up torsion forces.

At one of the outer ends of the subframe 10, a mounting plate 13a is arranged which is intended to cooperate with a second mounting plate 13b of a fully or partly complementary design. The second mounting plate 13b is arranged at one end of the intermediate beam 5.

The mounting plates 13a, 13b are, as can be seen in FIG. 2 for example, arranged across the longitudinal direction of the subframe 10. This means that forces directed in the longitudinal direction of the subframe 10, for example recoil forces when firing the gun module 3, are transferred via contact between the mounting plates 13a, 13b at right angles to their extension. In this way, large recoil forces can also be managed without the risk of damage to parts of the construction, such as fastening and connecting elements.

Figure 3A:
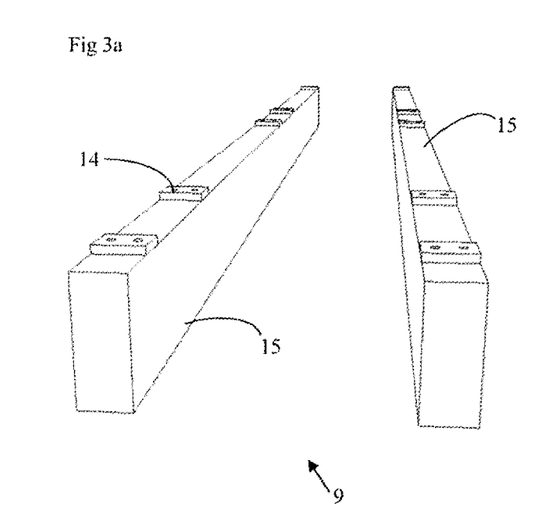
FIGS. 3a and b show perspective views of a carrier frame of a load carrier included in the weapons system according to the invention.
Figure 3B:
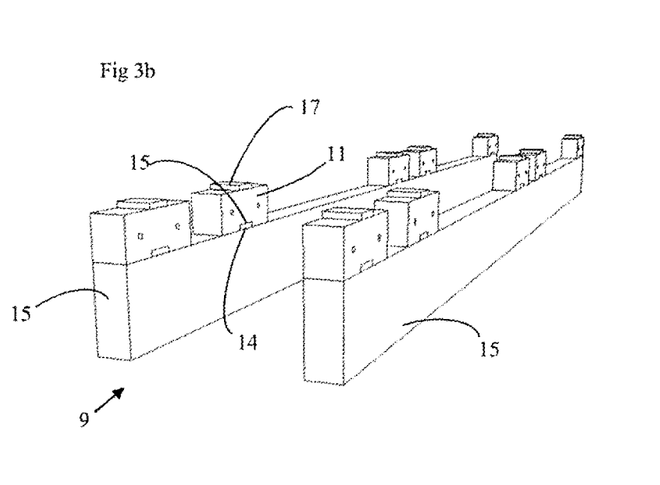

The subframe 10 is arranged so that it extends above and along the carrier frame 9, at least partly in contact with the carrier frame. In the preferred embodiment, the carrier frame 9 is provided with a series of raised bosses 14 on its upper side. Preferably, the bosses 14 are arranged in pairs, opposite each other, each on a beam 15 of the carrier frame 9. This can be seen clearly in FIGS. 3a and b.

In the preferred embodiment, spacer blocks 11 are arranged between the carrier frame 9 and the subframe 10. The spacer blocks 11 are designed with recesses 16 on its underside, so that the bosses 14 can be received in the recesses 16 and position the spacer blocks 11 on the carrier frame 9. In the preferred embodiment, the spacer blocks 11, on their upper sides, have bosses 17, which in turn are received in recesses 18 on the subframe 10, for positioning this partly in relation to the spacer blocks 11, and partly in relation to the carrier frame 9. The spacer blocks 11 provide an opportunity to adjust the height of the weapons system 1, also depending on the height and position of the included frame 10, 11. Nevertheless, the carrier frame 9 can also be arranged on a great variety of supporting structures, as well as vehicles and crafts and fixed constructions, and the need for adjusting the height therefore varies greatly. The appropriate final height is also affected by the gun module 3, which is to be mounted, and the desired application.

Figure 4A:
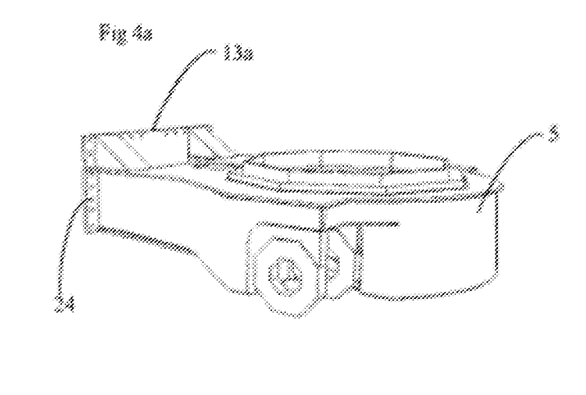
FIGS. 4a and b show perspective views of an intermediate beam integral to the weapons system of FIGS. 1 and 2.
Figure 4B:
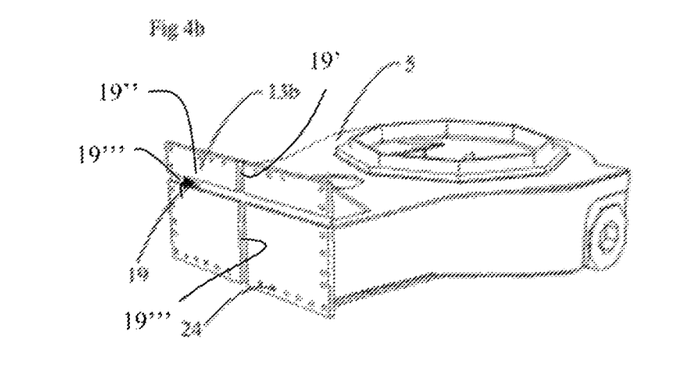

The intermediate beam 5 and its mounting plate 13b are shown in more detail in FIGS. 4a and 4b. In the preferred embodiment, the mounting plate 13b has depressions 19 in the form of crossing grooves. Corresponding elevations on the mounting plate 13a of the subframe 10 are insertable in die depressions 19 and prevent the mourned mounting plates 13a, 13b from slipping in the contact plane. In order to retain the mounting plates 13a. 13b in contact with each other, screws can be arranged through the holes 24 available at the edges of the mounting plates 13a, 13b.

Figure 5:
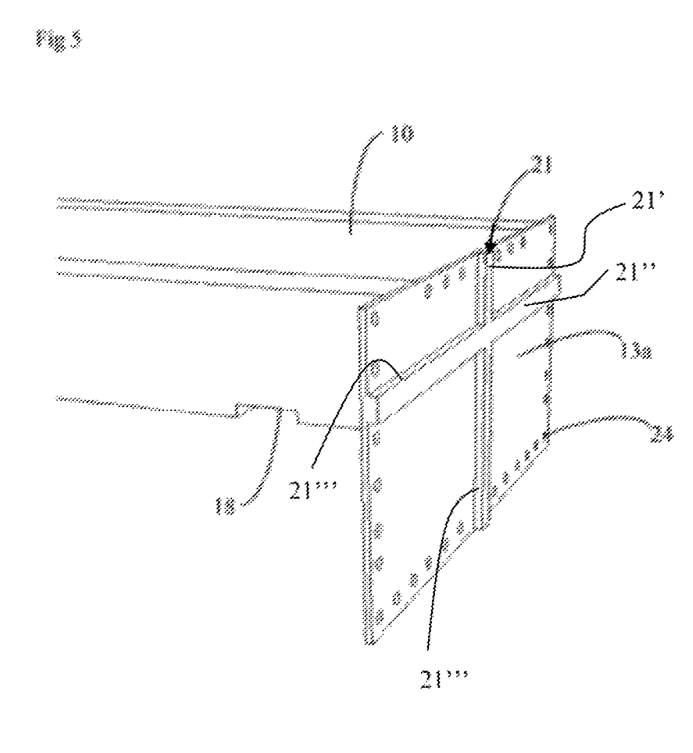
FIG. 5 shows a perspective view of a subframe integral to the weapons system.

FIG. 5 shows the frame and the mounting plate 13a from a different angle, so that the elevations 21 on the mounting plate 13a are visible. The elevations 21 and depressions 19 interact to provide a connection that can withstand, high forces. The edges of the depressions 19 and elevations 21 press against each other with varying forces when the connection between the mounting plates 13a, 13b is subjected to lateral forces. Almost all movements when driving the load carrier 2, or when aligning and firing the gun module 3, will have component forces directed in the plane of the mounting plates 13a, 13b, and the depressions or grooves 19 and the elevations 21 are therefore most useful for providing a rigid connection between the subframe 10 and the intermediate beam 5. It is also important, in, order to optimize the strength of the connection, that the depressions 19 and the elevations 21 have portions 19' and 19" and 21' and 21" that are transverse to each other. This means that, in at least one portion, at least their tangents must intersect, generally at right angles. The edges of at least one portion must intersect to completely ensure that the mounting plates 13a, 13b do not rotate in relation to each other. Particularly, as seen for example in FIGS. 4b and 5, the protrusions (elevations) 21 and depressions 19 have side edges 21'" and 19'", respectively, which in a first portion 19' and 21' are arranged substantially at right angles to the side edges of the other portion 19" and 21", to take up component forces that are directed across the side edges. The side edges 21'" and 19'" of the protrusions 21 and depressions 19 in at least one portion intersect each other to prevent rotation of the mounting plates in relation to each other. Fixed joints 100, such as bolts, screws etc. in shown in phantom in FIG. 6, are arranged to retain the mounting plates 13a, 13b in contact with each other.

When mounting the gun module 3 and the intermediate beam 5 on the subframe 10, a rigid connection between the intermediate beam 5 and the subframe 10 is thus provided on account of the mounting plates 13a, 13b. Both locking and releasing the joint is quick and simple, since only a limited number of screw joints need be affected. Transferring a gun module 3 from a load carrier 2 to another load carrier, also fitted with a subframe 10, can be carried out relatively quickly. Exchanging gun modules 3 on one and die same load carrier 2 is just as simple and quick.

Figure 6:
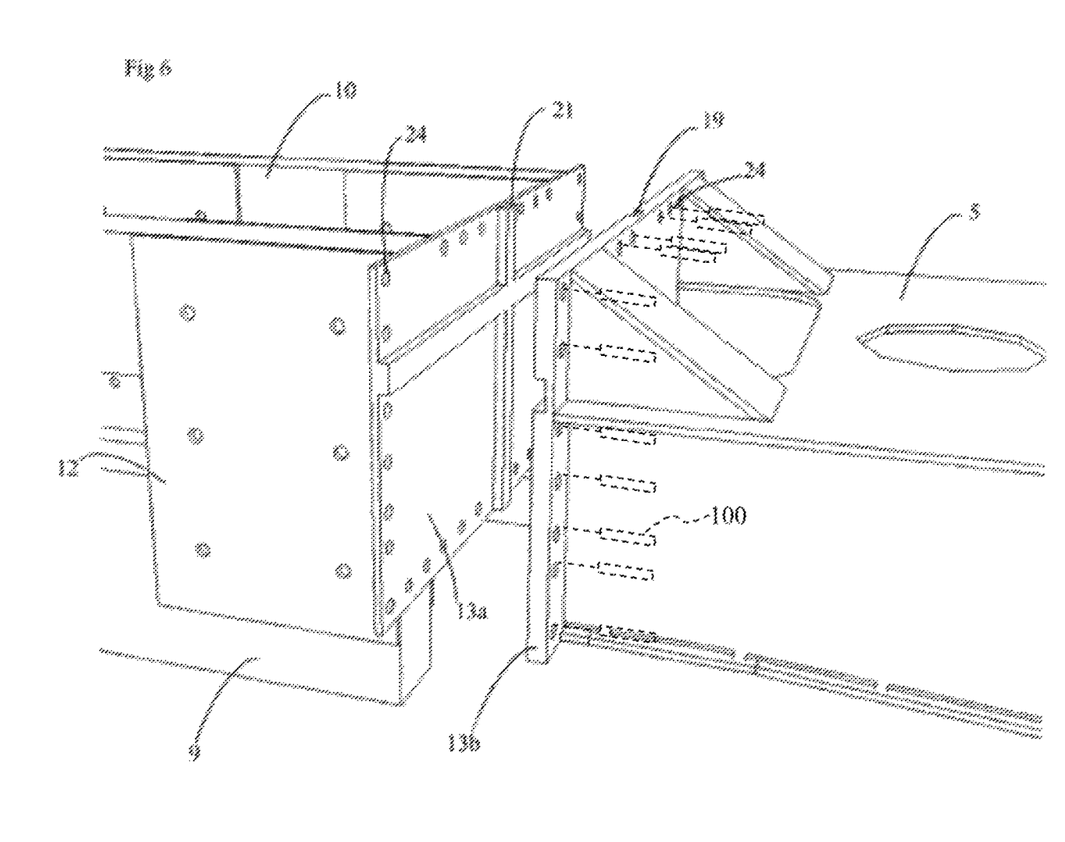
FIG. 6 shows a perspective view of the interconnection of the intermediate beam, a carrier frame and the subframe.

FIG. 6 shows both the carrier frame 9 and the subframe 10 connected by means of joining plates 12 that are attached to respective frame 9, 10 by means of a series of screw joints.

Figure 7:
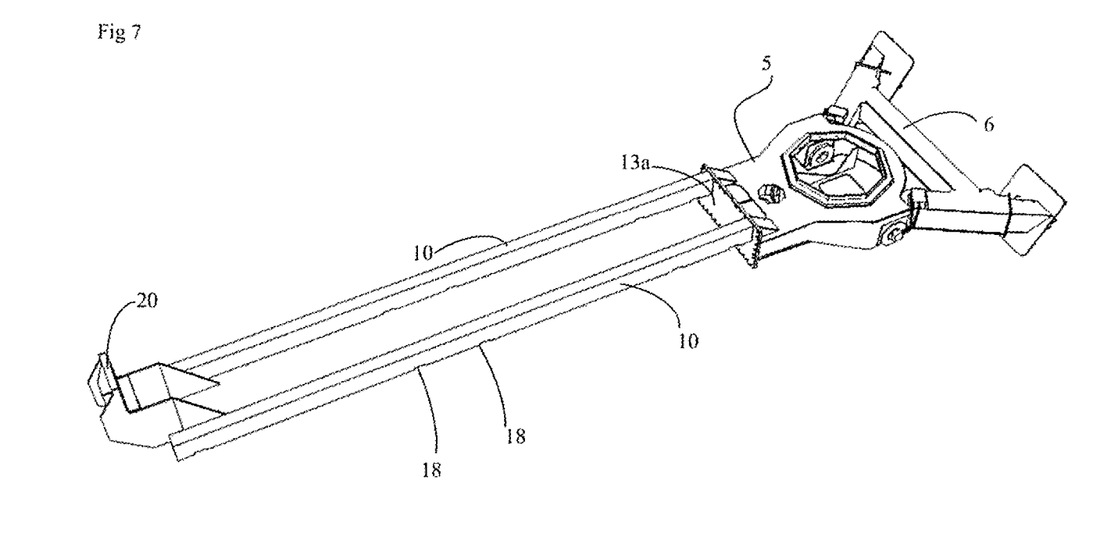
FIG. 7 shows a perspective view of the subframe and the intermediate beam in an interconnected state.

FIG. 7 shows the subframe 10 and the intermediate beam 5 mounted via the mounting plates 13a, 13b. This figure also shows the recesses 18 on the underside of the subframe 10. At the end of the subframe 10 opposite to the end where the intermediate beam 5 is mounted, a protruding securing bracket 20 is arranged to provide a good attachment of the superstructure module 4. The protruding securing bracket 20 is securely welded or screwed to the subframe 10. If desired, the protruding securing bracket 20 is used for anchoring the superstructure module 4.

The protruding securing bracket 20 is also used to anchor the barrel extending forwards from the weapon on the gun module 3 during transport. The fact that the front portion of the barrel on most guns is movable a short distance back and forth in the longitudinal direction of the barrel is advantageously used here. Hence, releasing from and anchoring to a protrusion on the protruding securing bracket 20 is quick when the barrel is allowed to surround the protrusion on the protruding securing bracket 20 in an anchored position. When the front portion of the barrel moves slightly rearward, the barrel is released from the protrusion, and the barrel can be pivoted away from the protruding securing bracket 20.

Mounting of the subframe 10 and the intermediate beam 5 is shown step by step in FIGS. 8 a-c. The carrier frame 9 in FIG. 7a is provided with a number of spacer blocks 11 on its raised bosses 15. The elevations 17 on the spacer blocks 11 are aligned with the recesses 18 on the underside of the subframe 10, as shown in FIG. 8b. In order to fix the carrier frame 9, the spacer blocks 11 and the subframe 10 i relation to each other, die joining plates 12 are arranged in the area of the spacer blocks 11 on each side of the beams 15 in the subframe 10 and in the carrier frame 9. The screws are tightened through the joining plates 12 on one side and the subframe 10, spacer blocks 11 and the carrier frame 9 respectively on the other side.

Figure 8A:
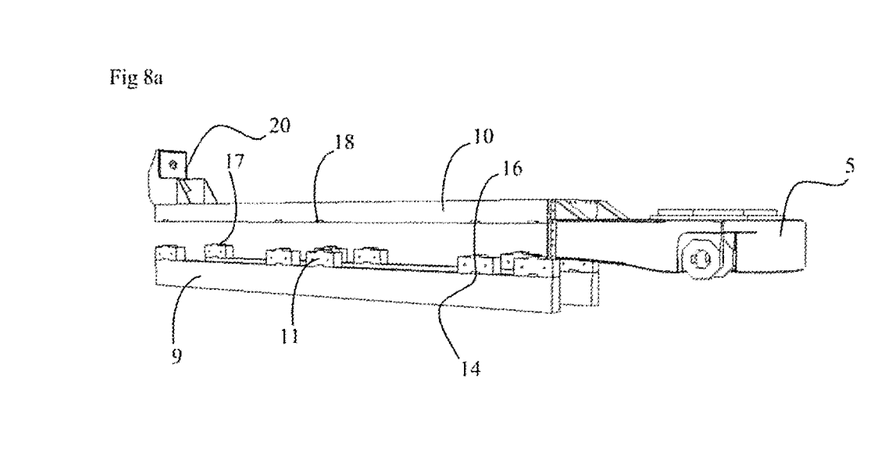
FIGS. 8a-d show perspective views of the carrier frame according to FIGS. 6a-b, the subframe and the intermediate beam, with and without spacer blocks.
Figure 8B:
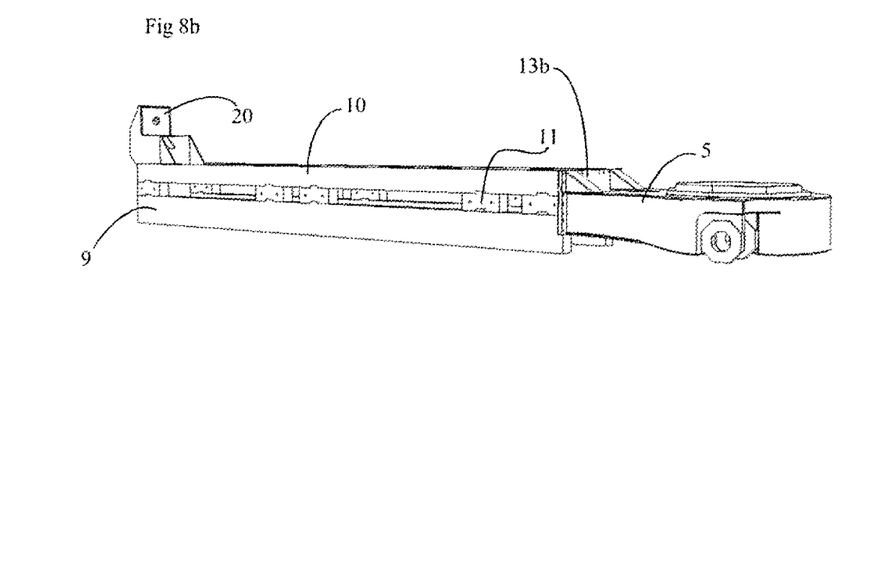
Figure 8C:
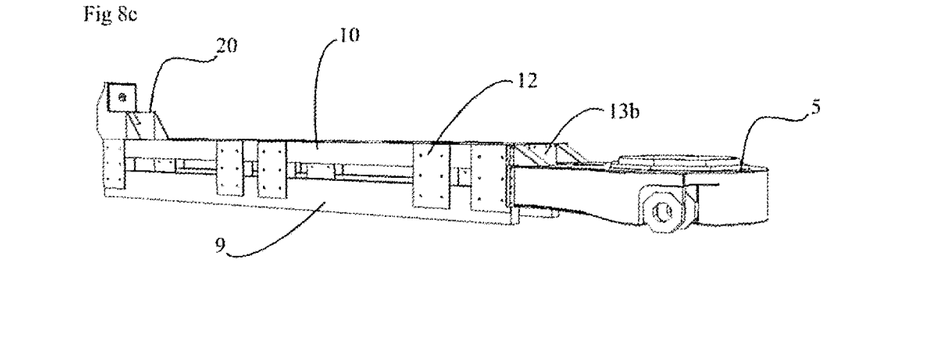
Figure 8D:
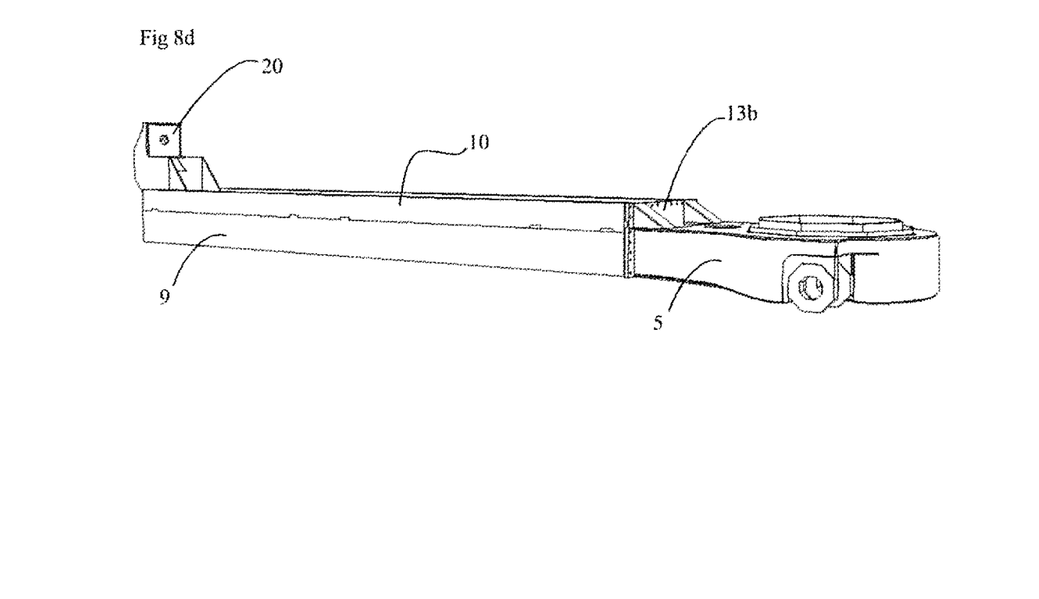

In some embodiments, the spacer blocks can be omitted, as shown in FIG. 8d, where a direct abutment between the carrier frame 9 and the subframe 10 provides the desired build height for the current application.

Figure 9:
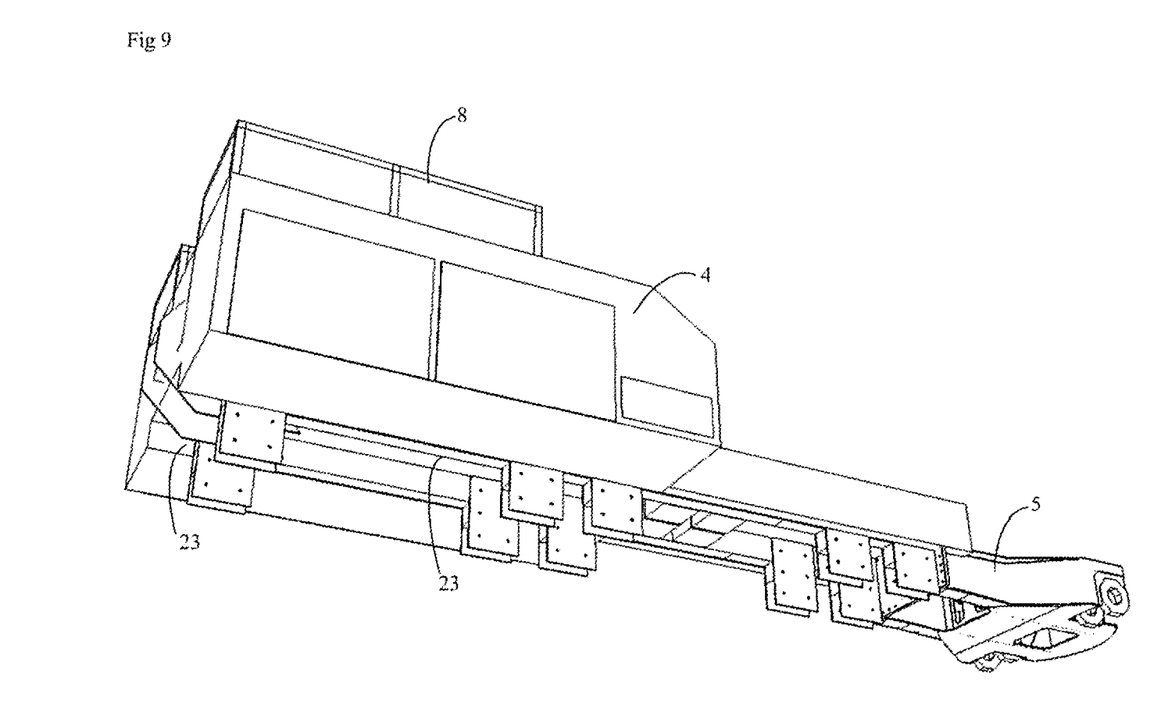
FIG. 9 shows a perspective view of a superstructure module that can be optionally arranged in the weapons system.

FIG. 9 shows the superstructure module 4, which in the preferred embodiment is mounted on the subframe 10, seen in a perspective view obliquely from below. The underside of die superstructure module 4 has longitudinal recesses 23 for receiving the integral beams 15 in the carrier frame 9 and the subframe 10. In addition, in some embodiments, the superstructure module 4 is provided with anchoring means for anchoring the superstructure module 4 to the protruding securing bracket 20 and/or other parts of the subframe 10. The superstructure module 4 is optional in principle; however, since the recesses 23 on its underside surround and are fixed at least to the subframe 10, the superstructure module 4 is conducive to some extent to increasing the stability and strength of the construction in the weapons system 1.

In summary, the system provides an interface between the integral parts in such a way that these do not need to be adjusted to each other. Instead, they can be coupled on the sole condition that they have the current interface in the form of the intermediate frame 10 and the mounting plates 13a, 13b.

The invention can be varied within the scope of the attached patent claims. As mentioned, the superstructure module 4 can be omitted if there is no immediate need for the storage spaces it provides.

The gun module 3 is often a howitzer, but it could be almost any type of weapon, provided that the dimension and weight limits set by the load carrier 2 are complied with. It is of particular interest that an exchange of the gun module is relatively quick.

The gun module 3 can also be provided with different forms of encapsulations, principally for protection against environmental effects, such as rain, seawater, sand etc.

The load carrier 2 can, as previously mentioned, be many different types of supports, such as different types of vehicles, crafts or fixed structures, not exclusively truck-type vehicles.

Since the carrier frame 9 in the preferred embodiment is rigid in principle, and the wheel suspension is such that torsion forces are not transferred to the carrier frame 9, the connection between the carrier frame 9 and the subframe 10 is also rigid. In practice, this is achieved by the joining plates 12 being rigid in themselves and by their attachments to the carrier frame 9 and the subframe 10 being rigid. If, however, the wheel suspension is more rigid, it needs to be taken into account that the forces from the wheels are transferred to the carrier frame 9 when driving, especially if the terrain is difficult. In order to compensate for this, the joint between the carrier frame 9 and the subframe 10 needs to be made flexible. Instead of the rigid joining plates 12, in some alternative embodiments a flexible joint is arranged between the somewhat flexible carrier frame 9 and the rigid subframe 10. Such flexible joints are advantageously provided according to the technique known to those skilled in the art.

The invention claimed is:

1. An attachment arrangement for a gun module of a carrier, having a fixedly mounted ca r frame, comprising at least two elongated frame portions, and the attachment arrangement comprising an intermediate beam, on which the gun module can be arranged, a subframe for arranging on the carrier frame, and a pair of interacting mounting plates, a first one of the mounting plates being arranged at a rearward end of the subframe and and a second one of the mounting plates being arranged at a forward end of the intermediate beam for a connection between them, the first one of the mourning plates being provided with one or more depressions, while the second mounting plate being provided with one or more protrusions whose form, size and position correspond to the form, size and position of the one or more depressions on the first mounting plate, wherein the first and second mounting plates are arranged substantially parallel to each other transverse to a longitudinal direction of the subframe.

2. The attachment arrangement according to claim 1, wherein the one or more protrusions and the one or more depressions have side edges respectively, and the one or more protrusions and the one or more depressions have respective first portions with side edges arranged substantially at right angles to side edges of respective second portions of the one or more protrusions and the one or more depressions, to take up component forces that are directed across the side edges.

3. The attachment arrangement according to claim 1, wherein the one or more protrusions and the one or more depressions each have side edges and portions that intersect each other to prevent rotation of the mounting plates in relation to each other.

4. The attachment arrangement according to claim 1, wherein fixed joints are arranged to retain the first and second mounting plates in contact with each other.

5. The attachment arrangement according to claim 1, wherein joining plates extend along the sides of the carrier frame and the subframe and they are connected to both the carrier frame and the subframe for joining these.

6. The attachment arrangement according to claim 1, wherein bosses and corresponding recesses are arranged on the carrier frame and the subframe respectively, for controlling these in relation each other.

7. The attachment arrangement according to claim 6, wherein spacer blocks are arranged between the carrier frame and the subframe at the bosses and the recesses for controlling a distance between them.

8. A weapons system comprising an attachment arrangement according to claim 1, further comprising a superstructure module having storage spaces on top of the subframe.

9. The weapons system according to claim 8, comprising a gun module, wherein the gun module comprises a howitzer.

* * * * *